US006788809B1

(12) United States Patent
Grzeszczuk et al.

(10) Patent No.: US 6,788,809 B1
(45) Date of Patent: Sep. 7, 2004

(54) SYSTEM AND METHOD FOR GESTURE RECOGNITION IN THREE DIMENSIONS USING STEREO IMAGING AND COLOR VISION

(75) Inventors: Radek Grzeszczuk, Mountain View, CA (US); Gary R. Bradski, Palo Alto, CA (US); Michael H. Chu, Santa Clara, CA (US); Jean-Yves Bouget, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 799 days.

(21) Appl. No.: 09/607,820

(22) Filed: Jun. 30, 2000

(51) Int. Cl.[7] ................................................. G06K 9/00
(52) U.S. Cl. ......................... 382/154; 382/103; 345/419
(58) Field of Search ................................. 382/100, 103, 382/154, 155, 159, 164, 165, 173, 181, 276; 235/419–427; 356/12, 21, 22; 348/77, 169; 345/419, 418, 427

(56) References Cited

U.S. PATENT DOCUMENTS

| 6,128,003 A | * | 10/2000 | Smith et al. | ................. | 345/157 |
| 6,363,160 B1 | * | 3/2002 | Bradski et al. | ............. | 382/103 |
| 6,394,557 B2 | * | 5/2002 | Bradski | ....................... | 382/103 |
| 6,538,649 B2 | * | 3/2003 | Bradski et al. | ............. | 345/419 |

OTHER PUBLICATIONS

Hongo, H. et al., "Focus of attention for face and hand gesture recognition using multiple cameras", Automatic Face and Gestu Recognition, 2000. Proceedings. Fourth IEEE International Conference, pp 156–161, Mar. 2000.*
Koichi Ishibunchi et al., "Real Time Hand Shape Recognition Using Pipe–line Image Processor", IEEE International Workshop o robot and Human Communication, pp. 111–115, 1992.*
Luis Goncalves et al., "Monocular tracking of the human arm in 3D", Proc. 5th Int. Conf. On Computer Vision, pp. 764–770, IEEE, 1995.*
W.T. Freeman et al., "Computer Vision for computer games", Int. Comf on Automatic Face and Gesture Recognition, pp 100–105, 1996.*
Chung–Lin Hung et al., "A model–based Complex Background Gesture Recognition System",IEEE, vol. 1, pp. 93–98, 1996.*
"Parameter estimation techniques: a tutorial with application to conic fitting", Zhengyou Zhang, Image and Vision Computing 15 (1997) 59–76; 1997 Elsevier Science B.V.

* cited by examiner

Primary Examiner—Samir Ahmed
(74) Attorney, Agent, or Firm—Steven D. Yates

(57) ABSTRACT

A system and method for recognizing gestures. The method comprises obtaining image data and determining a hand pose estimation. A frontal view of a hand is then produced. The hand is then isolated the background. The resulting image is then classified as a type of gesture. In one embodiment, determining a hand pose estimation comprises performing background subtraction and computing a hand pose estimation based on an arm orientation determination. In another embodiment, a frontal view of a hand is then produced by performing perspective unwarping and scaling. The system that implements the method may be a personal computer with a stereo camera coupled thereto.

29 Claims, 7 Drawing Sheets

(4 of 7 Drawing Sheet(s) Filed in Color)

(a) Original Images     (b) Warped Images     (c) Template Images

SYSTEM AND METHOD FOR GESTURE RECOGNITION IN THREE DIMENSIONS USING STEREO IMAGING AND COLOR VISION

BACKGROUND

1. Field of the Invention

The present invention relates to the field of computer vision and image and gesture recognition. More specifically, this invention relates to a stereo-based approach for gesture recognition.

2. Background

Gestures enrich human communication in a natural and unobtrusive way. Gestures can also enrich human-computer interaction in a similar way. Gestures can provide part of a more natural human computer interface. As in the past, when decreasing cost and increasing computer power enabled development of graphical interfaces controlled by 2D mouse movements, so too today, computers and processors, and other technology are becoming powerful enough to provide a new avenue of human-computer communication and interaction.

Gesture modeling can be classified as either model-based or appearance-based. Model-based approaches for moving articulated objects such as human hands are computationally expensive and difficult to implement. Conversely, appearance-based models need to take account of changing views and topology. Vision-based gesture recognition has been applied successfully to numerous applications such as computer game navigation, TV remote control, American Sign Language recognition, and virtual navigation. The recent availability of stereo camera systems has stimulated new research on stereo-based tracking. Some recent systems use stereo cameras to track self-occluding articulated objects or to combine stereo with other cues to track people. One prior art system presents a method for fitting a complex articulated model of the hand to stereo data. Another prior art system combines range, edge, and color information to track fingers. Image unwarping based on model orientation has been used in the field of face recognition and has, up to now not been applied in the field of hand gesture recognition using stereo images.

Much of the previous work in gesture recognition excludes stereo images. The prior art includes use of gradient orientation histograms for recognizing hand gestures under constrained movement conditions. Another technique combines gradient histograms with a color probability density tracker to allow hand gesture recognition with free movement. And another method uses a downward pointing camera mounted in a baseball cap to aid in color segmentation of the user's hands for American Sign Language recognition.

Visual interpretation of human gestures by computers promises a simple and unobtrusive method of human-computer interaction. Yet, a system that can distinguish human gestures in a variety of settings regardless of environmental interference has been elusive.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

DETAILED DESCRIPTION

The method and system of the present invention provide a gesture recognition approach that can be used in environments where lighting is variable and uncontrolled and the background may be highly cluttered. The method and system also work seamlessly in extreme lighting situations such as those encountered with projection displays projecting on hands, and with hands moving in front of large screens displaying rapidly varying patterns. In such conditions, simple flesh color segmentation schemes fail to find the hands. The method and system of the present invention use stereo data to drive robust color segmentation and gesture recognition.

The method and system of the present invention combine stereo and color information to provide gesture recognition that works well under extreme lighting conditions and recognizes a large range of hand poses. The method and system of the present invention provide a hybrid gesture representation that models the user's arm as a 3D line and uses image templates to represent hand gestures. This hybrid representation avoids the inherent inaccuracies of model-based approaches by using template images to recognize hand gestures. The method and system of the present invention avoid the view dependency of appearance-based approaches by using arm orientation information to compute a frontal view of the hand through perspective unwarping. In addition, the method and system of the present invention use stereo data to determine the 3D arm orientation and the hand pose. The hand pose is then used to initialize a color based segmentation algorithm that cleanly separates the hand from the background. The arm orientation is used to compute a frontal view of the hand through perspective unwarping, producing easily recognizable hand gesture templates.

I. A Hardware Environment of An Embodiment of The Present Invention

Figure 1:
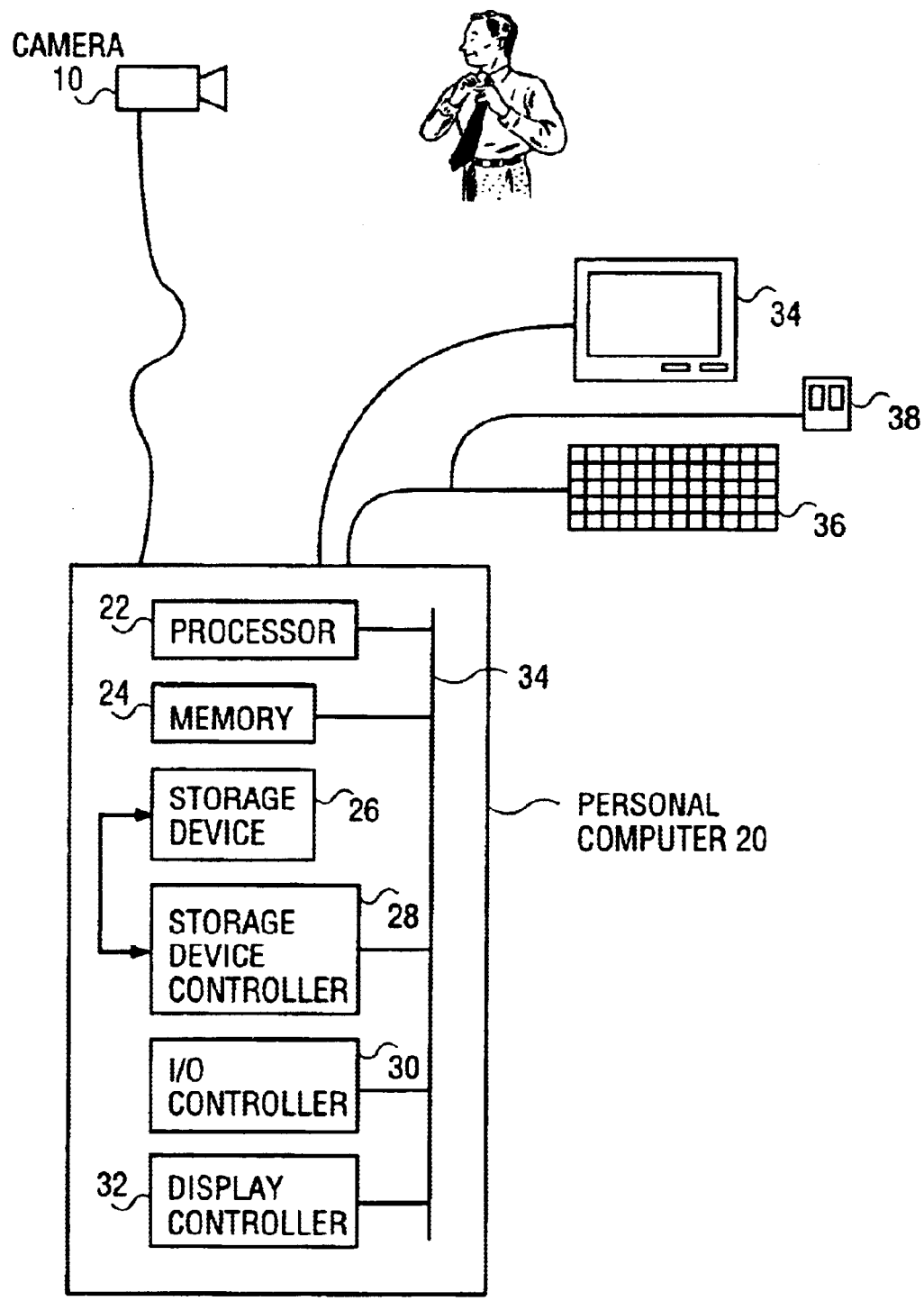
FIG. 1 illustrates the hardware and environment of one embodiment of the present invention.

FIG. 1 illustrates the hardware and environment of one embodiment of the present invention. In one embodiment, a stereo camera 10 is used to capture a stereo image and communicate the image to personal computer 20. Any stereo camera may be used. In one embodiment, the stereo camera provides depth data, also referred to as disparity data, and a reference color image. The depth data provides the x, y and z coordinates for each pixel in the color image. The color image provides a red, a green, and a blue value for each pixel in the image. In this embodiment, the camera used is available from Point Grey Research, Inc., Vancouver, British Columbia, Canada. Any image resolution may be used, including, but not limited to, 160×420 pixels and 640×480 pixels. Personal computer 20 may be any personal computer that includes processor 22 to execute software that implements the method of the present invention. The processor may be any processor. The processor uses memory 24 to store the program and other information obtained from storage device 26 via storage device controller 28. The memory may be any random access volatile memory device. The storage device may be any device from which the processor can read from a machine readable medium such as, for example, a hard disk, floppy disk, compact disk read only memory (CD-ROM), memory stick or flash memory device, programmable read only memory (PROM), etc. The personal computer may display information to a user on display 34 via display controller 32. The display may be a cathode ray tube (CRT) monitor, a thin film transistor (TFT) device, or any other means for displaying an image to a user, including a projector. The personal computer receives input from a user via input-output (I/O) controller 30 that allows for receipt of information from input devices such as, for example, camera 10, keyboard 36 and mouse 38. The I/O controller may support any serial and/or parallel communications adhering to any well known standards. Processor 22, memory 24, storage device controller 28, I/O controller 30 and display controller 32 are coupled to bus 34, which may be any bus that provides for inter-component communication within a personal computer. Although only single instances of processor 22, memory 24, storage device controller 28, I/O controller 30, display controller 32, and bus 34 are depicted with regard to personal computer 20, multiple instances of each of these components may be present, and additional components (not depicted) may also be added to the personal computer.

This system implements the method of the present invention that uses a stereo-based approach to gesture recognition that performs robustly under extreme lighting conditions and for a wide range of 3D poses.

II. A Method of the Present Invention

Figure 2:
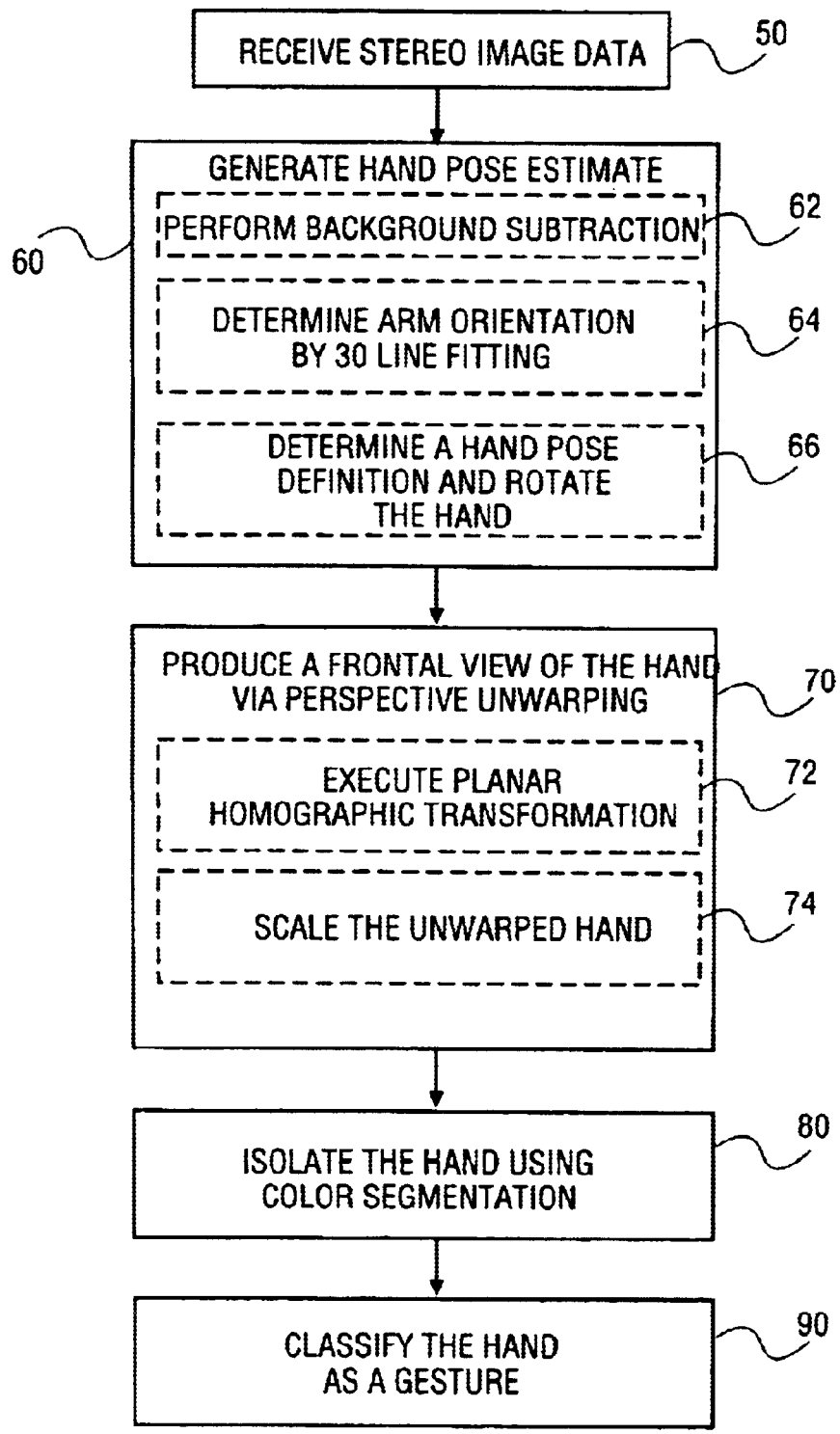
FIG. 2 illustrates the flow of actions taken according to the method of the present invention.

FIG. 2 illustrates the flow of actions taken according to the method of the present invention. The method begins by receiving stereo image data from a stereo camera, as shown in block 50. In one embodiment, the stereo image data includes depth data and a reference color image. A hand pose estimate is then generated, as shown in block 60. In one embodiment, the hand pose generation may be broken down into three components. Pre-processing that accomplishes background subtraction is performed, as shown in block 62. The arm orientation is then determined by 3D line fitting, as shown in block 64. The hand pose definition is then obtained and the hand is rotated, as shown in block 66. An underlying assumption is that the user's arm (and no other portion of the user's body) is in the viewing field of view of the camera. The method uses the arm orientation and the hand pose definition to compute a frontal view of the hand through perspective unwarping, as shown in block 70. Perspective unwarping produces an easily recognizable hand gesture template. Perspective unwarping includes planar homographic transformation and scaling. Through a planar homographic transformation a frontal view of the hand is produced, as shown in block 72. Scaling the unwarped image of the hand expands or shrinks the hand to conform to a definition of a typical hand size, as shown in block 74. Scaling involves choosing a fixed correspondence between pixel dimensions and real dimensions. The frontal view of the hand produced by perspective unwarping produces a template. Color segmentation is then performed to isolate the hand from the background based on a probability density estimate that a pixel with a given hue and saturation value belongs to the hand, as shown in block 80. Classification of the gesture represented by the now unwarped and scaled hand is performed using, in one embodiment, statistical moments of binarized gesture templates to find a match between an image in the gesture library and the currently analyzed hand image, as shown in block 90. Each of these steps is set forth in more detail below.

The hybrid representation of a hand of the present invention avoids the inherent inadequacies of model-based approaches by using images to represent the hand gestures. It avoids the view dependency of appearance-based approaches by using the arm orientation information to compute a frontal view of the hand through perspective unwarping.

Figure 3:
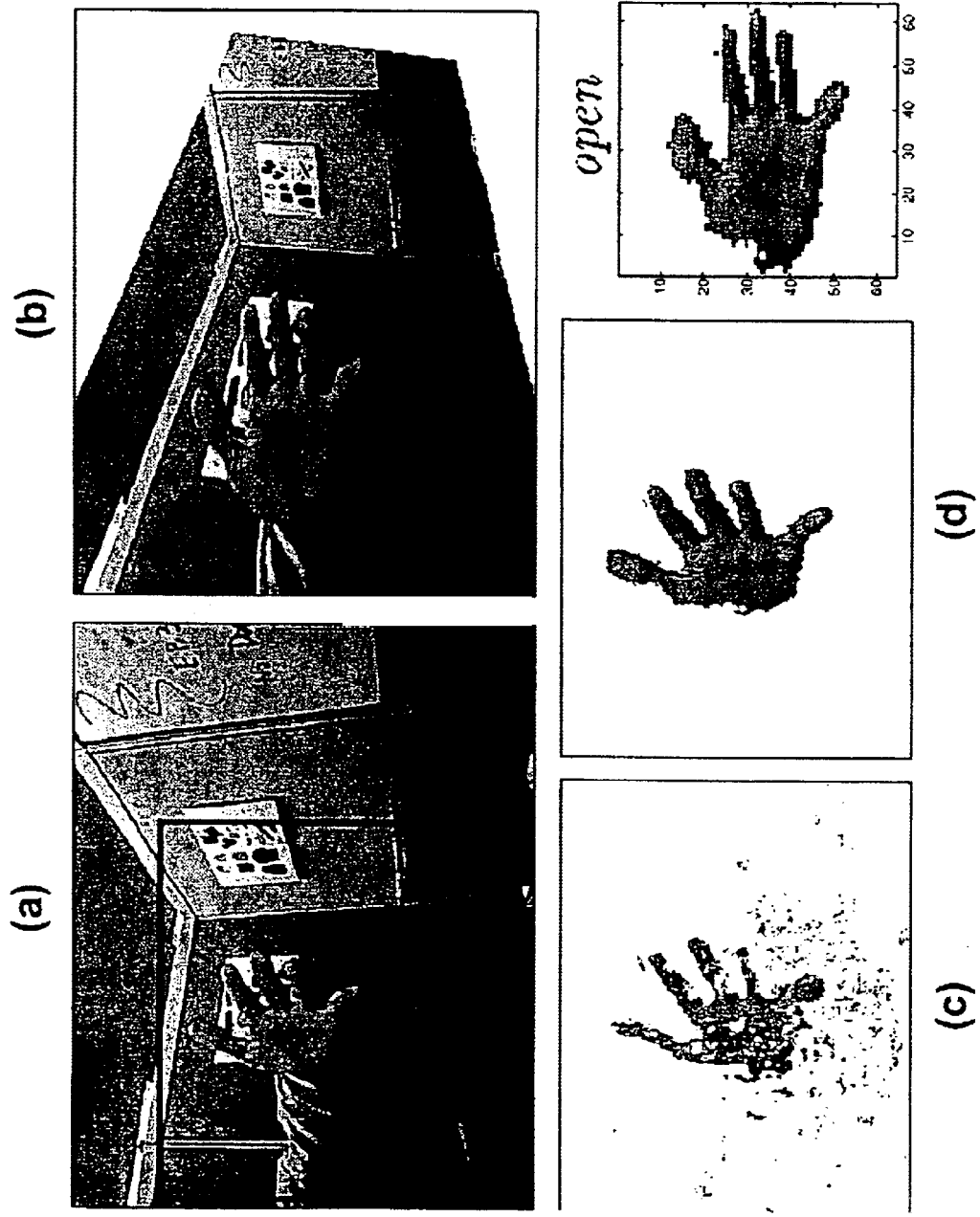
FIG. 3 illustrates the current state of an image at various stages of the method of the present invention.

FIG. 3 illustrates the current state of an image at various stages of the method of the present invention. FIG. 3a illustrates an initial image captured by the stereo camera. The bounding box evident in FIG. 3a corresponds to the projection of the region surrounding the hand onto the viewing plane. FIG. 3b illustrates an image after perspective unwarping of the hand plane into a frontal view. FIG. 3c illustrates the pixels inside the bounding box classified as foreground. Although noisy and imprecise, this data serves well to initialize the hand color probability distribution for color segmentation. FIG. 3d illustrates the result of isolating the hand from the background by color segmentation. FIG. 3e illustrates the "unwarped" gesture template together with the recognition result, in this example, open.

Figure 4:
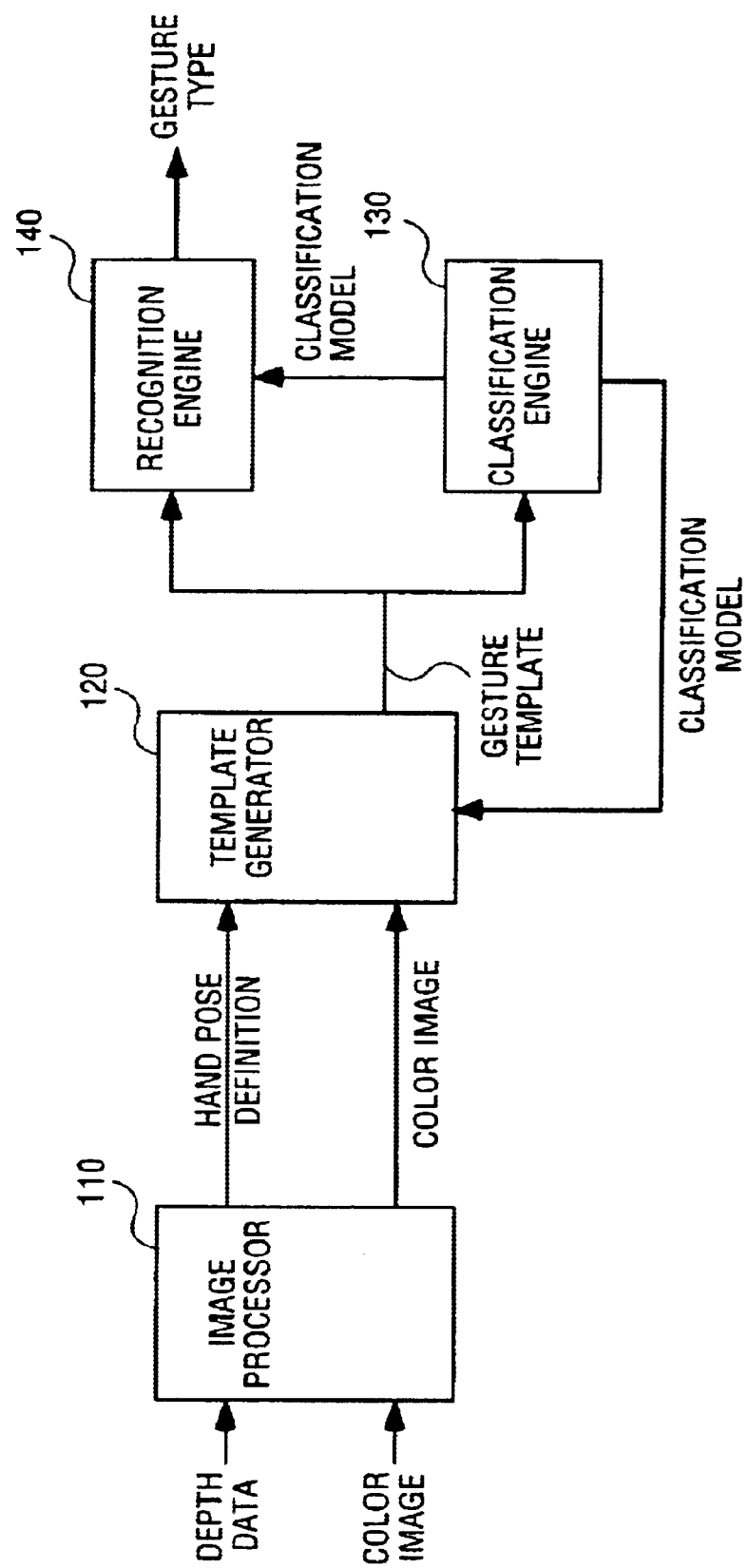
FIG. 4 illustrates a functional block diagram of one embodiment of the present invention.

FIG. 4 illustrates a functional block diagram of one embodiment of the present invention. The method of the present invention can be viewed as functional blocks. Image processor 110 receives disparity data and a color image as input. Image processor 110 then generates a hand pose estimate by performing background subtraction and determining the orientation of the arm. Template generator 120 receives the hand pose definition and produces a frontal view of the hand by perspective unwarping which includes executing a planar homographic transformation and scaling the unwarped hand. Classification engine 130 receives a gesture template from template generator 120 and prepares a classification model by isolating the hand using color segmentation. Recognition engine 140 uses the classification model and the image template to produce a conclusion as to what gesture type the image represents.

III. Details of the Present Invention

A. Hand Pose Estimation from Stereo

Caution must be exercised when fitting a model to range data obtained from a stereo camera since stereo cameras produce image data that are noisy and contain many outliers. Consequently, the hand pose computed directly solely from the range data is often inaccurate, even with a resolution of 640×480 pixels. Therefore, the present method divides the hand pose computation process, as shown in block 60 of FIG. 2, into the following steps. First, isolate the user's arm using the foreground pixels as determined by evaluation of the disparity data, amounting to a background subtraction, as shown in block 62. Second, determine the orientation of the arm by fitting a 3D line L to the foreground disparity data, as shown in block 64. Third, rotate a plane in 3D around L until the best fit of the plane to the arm data if found to determine a hand pose definition, as shown in block 66. Each of these is explained in succession.

1. Background Subtraction

In one embodiment, a disparity based background subtraction algorithm selects as foreground the pixels that have the difference between the mean background depth and the current depth larger then an empirically defined threshold. The threshold should be appropriately chosen as a function of the error in the range measurement. The background subtraction algorithm computes the mean background range map by averaging a small number of range images (such as from 5 to 10 images) of the background scene.

2. Fitting a 3D Line to Arm Data

To improve the quality and accuracy of the method, the fitting of L to the range data is accomplished, in one embodiment, by a two step process. The first step fits a first 2D line, the first fitted line, $d_1$, to the data in the image plane. The second step fits a second 2D line, the second fitted line, $d_2$, to the data along the direction of the first 2D line, but in the depth plane and perpendicular to the viewing plane. Mathematically, the two lines are parameterized using polar coordinates as $$d_1 = n_{1x} x + n_{1y} y \text{ and}$$

$$d_2 = n_{2x} x' + n_{2z} z$$

where x' is the orthogonal projection of the x-coordinates of the points onto the first fitted line.

Figure 6:
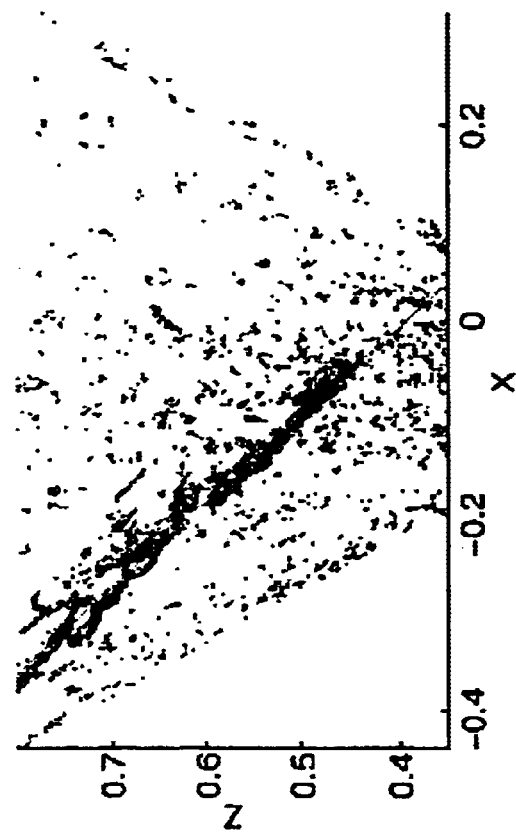
FIG. 6 illustrates a plot showing the second fitted line in the depth dimension.
Figure 5:
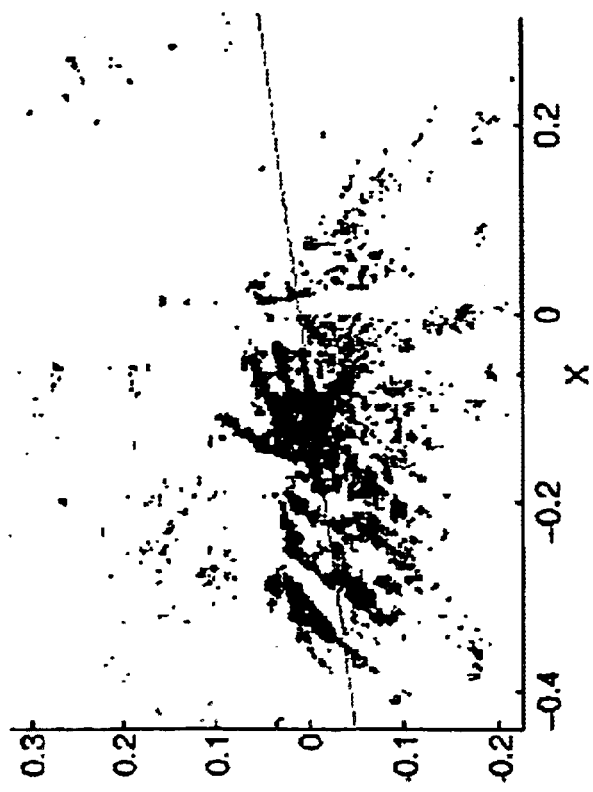
FIG. 5 illustrates a plot showing the first fitted line in the image plane
Figure 7:
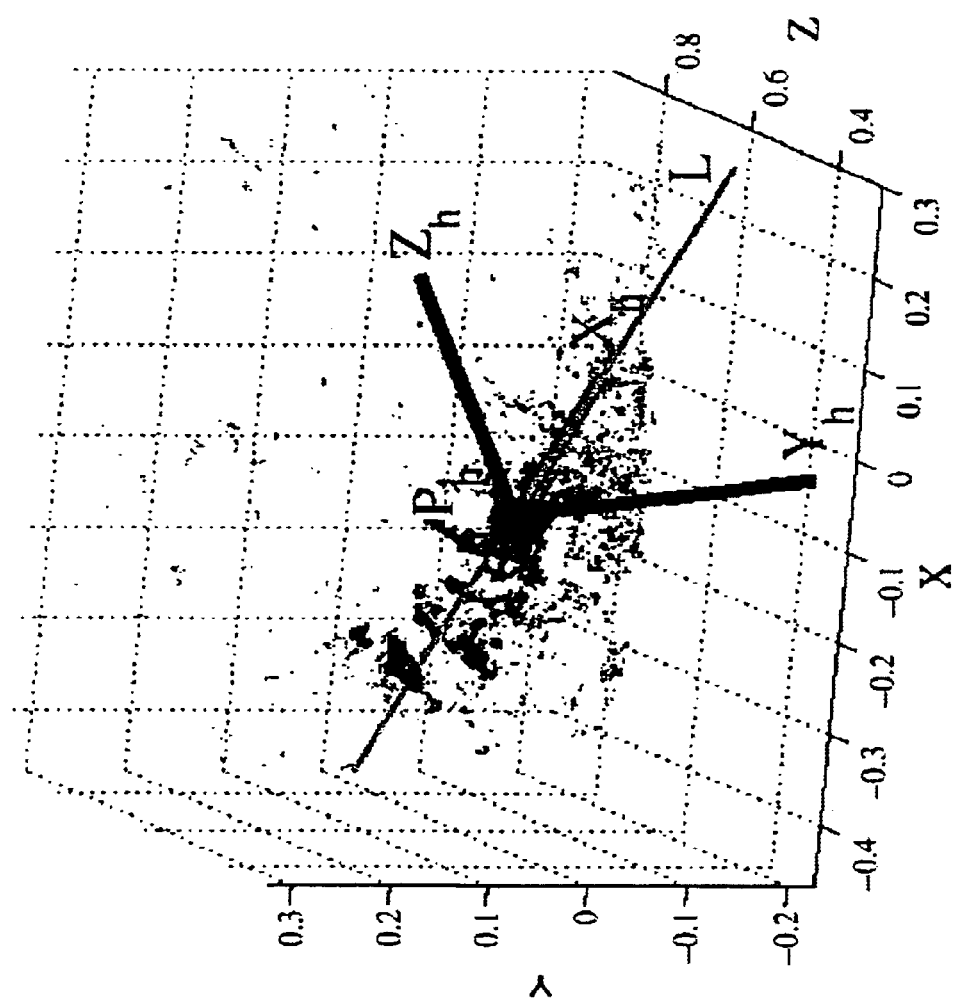
FIG. 7 illustrates the final estimate of fitted line L in three dimensions.

FIG. 5 illustrates a plot showing the first fitted line in the image plane, depicted in green. FIG. 6 illustrates a plot showing the second fitted line in the depth dimension, depicted in green. FIG. 7 illustrates the final estimate of fitted line, L, in three dimensions, depicted in green. This 3D line, L, is used for estimating the complete 3D pose of the hand and also for initializing color based hand segmentation.

Because the standard least squares fit method is unreliable in the presence of outliers, when fitting L to the arm data, in one embodiment, the method employs an iterative reweighted least square method that uses a Welsch M-estimator. For more information, see Z.Y. Zhang, *Parameter Estimation Techniques: A Tutorial With Application to Conic Fitting, Image and Vision Computing*, 15(1), pages 59–76, January 1997.

3. Hand Pose Definition

The complete 3D pose of the hand is defined by two components, the coordinates of the center of the hand $P_h$ and the absolute orientation of the hand with respect to a camera reference frame $R_h$. The center of the hand $P_h$ is the centroid of the range data of the segmented points along L. Referring again to FIG. 7, the center of the hand $P_h$ is depicted in blue. The hand reference frame is defined as three mutually orthogonal axes $x_h$, $y_h$ and $z_h$. These are depicted in purple in FIG. 7. To describe $R_h$, $x_h$ is aligned with L, $y_h$ is chosen so that the plane $\Pi_h = (P_h, x_h, y_h)$ is "most frontal" to the camera image plane, and $z_h$ is the axis orthogonal to $\Pi_h$.

The coordinate vector of a generic point in 3D in the camera is $x_c$, and the coordinate vector of a hand reference frame is $x_h$. These vectors are related to each other through the rigid motion transformation $$x_c = R_h x_h + T_h$$

where $T_h$ is the coordinate vector of $P_h$ in the camera reference frame, and $$R_h = R_1 R_2 \text{ (the Rotation Matrix Equation)}$$

is the simplest rotation matrix that maps the hand x-axis, $x_h$, to the camera x-axis, $x_c$. $R_1$ and $R_2$ are two elementary 3D rotation matrices corresponding to the two line fits:

$$R_1 = [n_1 \times u_z, n_1, u_z] \text{ and}$$

$$R_2 = [u_y \times n_2, u_y, n_2]$$

where $u_z = [0\ 0\ 1]^T$, $u_y = [0\ 1\ 0]^T$, and $n_1$ and $n_2$ are two 3D unit vectors associated with the two independent line fits $n_1 = [n_{1x}\ n_{1y}\ 0]^T$ and $n_2 = [n_{2x}\ 0\ n_{2z}]^T$.

The Rotation Matrix Equation expresses the rotation matrix $R_h$ as the combination of two elementary rotations, one about the z-axis and one about the y-axis. This produces a hand reference frame where the hand plane $\Pi_h$ is the "most frontal" to the image plane while containing the line L. This approximation of the hand plane location is used for image perspective unwarping.

B. Perspective Unwarping And Template Generation

After determining the hand pose, the frontal view of the hand is generated by moving the camera to a canonical location with respect to the hand reference frame through a rigid motion transformation. This is referred to as a planar homographic transformation. As a real camera is not repositioned, and the camera is only mathematically moved, this is referred to as a virtual camera having a virtual camera reference frame. An orientation and a translational position are used to describe the canonical camera location. To obtain the virtual camera orientation, the virtual camera reference frame is aligned with the hand reference frame ($P_h$, $x_h$, $y_h$, $z_h$). To determine the translational position, $P_h$ is chosen as a fixed point by defining the point $P_h$ to have the same coordinate vector $T_h = [T_x\ T_y\ T_z]^T$ in the virtual camera reference frame.

The coordinate vector of a point in the original camera reference frame is $x_c$, and the coordinate vector of a point in the transformed virtual camera reference frame is $x'_c$. These vectors are related to each other through the rigid motion transformation:

$$x_c = R_h x'_c + (I_{3 \times 3} - R_h) T_h$$

where $I_{3 \times 3}$ is the 3×3 identity matrix. The vector $T_h$ remains invariant through this transformation. As above, $R_h$ encodes the full 3D orientation of the hand defined in Equation 4. A new view of the hand is generated based on the camera motion transformation. The pixel projections of a generic hand point P on the image planes attached to the original and the transformed camera locations are, respectively, p and p'. The homogeneous pixel coordinates of p are $\bar{p} \approx [p_x\ p_y\ 1]^T$, and the homogeneous pixel coordinates of p' are $\bar{p}' \approx [p'_x\ p'_y\ 1]^T$, where "$\approx$" means equality up to a non-zero scalar. Since P is assumed to lie on $\Pi_h$, the two homogeneous vectors $\bar{p}$ and $\bar{p}'$ are related to each other through a homographic transformation $\bar{p} \approx H \bar{p}'$ where H is a 3×3 matrix defining the homography $$H = A_C (R_h + (I_{3 \times 3} - R_h) \bar{x}_h [0 0 1]) A_S^{-1}$$

In this homography, $\bar{x}_h = T_h / T_z = [T_x/T_z\ T_y/T_z\ 1]^T$ is the normalized image projection of the hand center point $P_h$, and $A_C$ is the 3×3 upper diagonal matrix containing the known intrinsic parameters of the calibrated camera such that:

$$A_C = \begin{bmatrix} f_x & \alpha & c_x \\ 0 & f_y & c_y \\ 0 & 0 & 1 \end{bmatrix}$$

The diagonal entries $f_x$ and $f_y$ are the virtual camera focal lengths in units of horizontal and vertical pixels, $c_x$ and $c_y$ are the principal point image coordinates, and $\alpha$ encodes the skew angle between the x and y axes of the virtual camera. The pixel conversion matrix $A_S$ is defined as $$A_S = \begin{bmatrix} f_x & \alpha & c_x \\ 0 & f_y & c_y \\ 0 & 0 & 1 \end{bmatrix}$$

After planar homographic transformation, scaling of the warped image is then performed. In one embodiment, scaling consists of aligning and packing the warped image of the hand into a template of size 64×64 pixels by choosing a fixed correspondence between pixel dimensions of the warped hand and the dimensions of the template. In this embodiment, 64 pixels correspond to 25 cm, ensuring the complete hand region fits within the square template.

Figure 8:
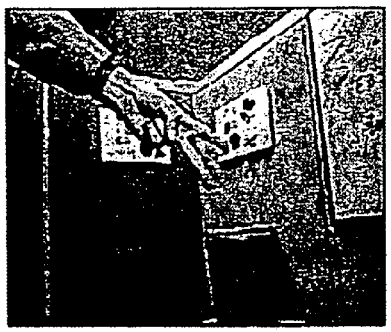
FIG. 8 illustrates the result of perspective unwarping and the result of template generation for three gestures.
Figure 8:
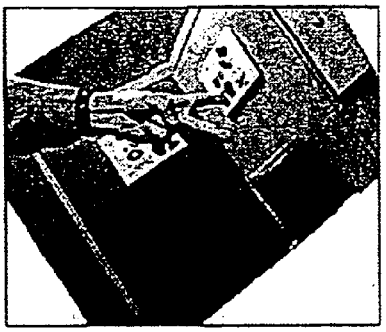
Figure 8:
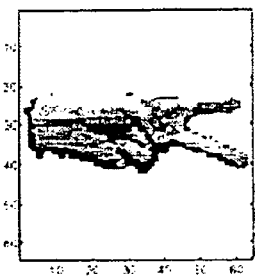
Figure 8:
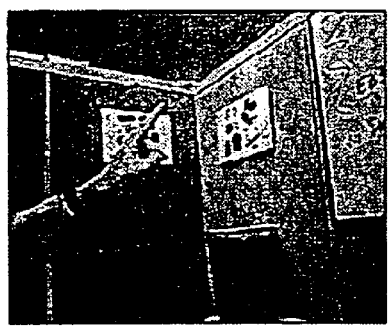
Figure 8:
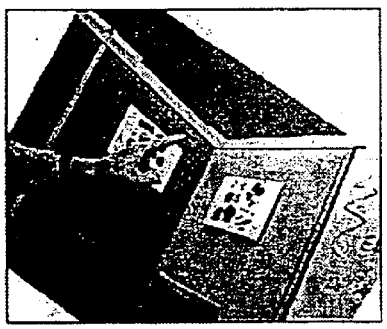
Figure 8:
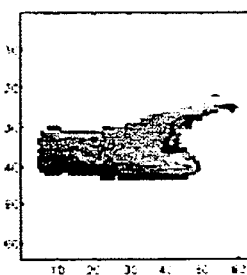
Figure 8:
Figure 8:
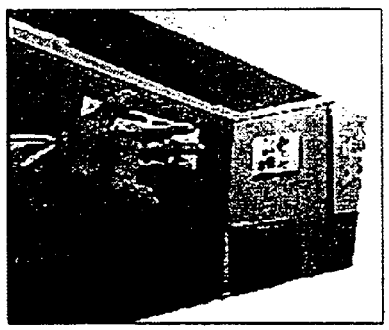
Figure 8:
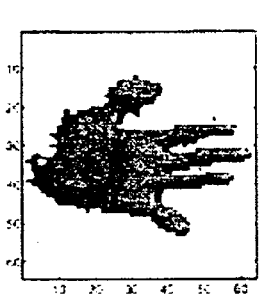

FIG. 8 illustrates the result of perspective unwarping and the result of template generation for three different gestures. The original images are illustrated in the left column, column (a). The warped images, amounting to a frontal view of the hand, are illustrated in the middle column, column (b). The right column, column (c) illustrates the resulting gesture templates.

In another embodiment, the same mathematical formulation for image warping may be used even if no depth information is available. In this embodiment, the rotation matrix $R_h$ may be substituted by the matrix $R_1$ which describes the hand orientation in the image plane. In this embodiment, the normalized image coordinate vector $\bar{x}_h$ becomes the image coordinate vector of the hand center. Therefore, in this embodiment, in the absence of depth data, a new homography matrix $H_{2D}$ is defined as $$H_{2D} = A_C (R_1 + (I_{3\times 2} - R_1) \bar{x}_h [001]) A_S^{-1}.$$

This homography matrix is equivalent to an affine transformation in the image plane; that is, it has no effect on perspective. The benefit of perspective unwarping on recognition using the homography H can be seen by comparing the result of H to $H_{2D}$ which generates a second set of templates that are not fully perspectively unwarped. The templates generated through that transformation are simply scaled and rotated versions of the original segmented hand images. The difference between the two sets of templates is the amount of perspective distortion along the x-axis of the template for which the affine warping $H_{2D}$ cannot not compensate. Accounting for perspective distortion has a significant positive impact on the recognition rate.

C. Hand Color Segmentation

The goal of the segmentation step is to cleanly separate the hand from the rest of the image. However, this task is difficult if only color information is available. In unusual lighting situations common in office environments that use projectors instead of traditional CRT (or TFT) monitors for displaying computer generated images, illumination from computer image projection affects hand color, lighting and shading in an unnatural way. A segmentation algorithm that will work in this situation begins with a good initial guess of the hand color. This guess may be based on the hand pose estimate as described above. The segmentation algorithm uses the hand pose to isolate the region of space containing the hand, and uses the pixels with range values within this region to initialize the hand color. Subsequently, the algorithm refines the initial hand color distribution through an iterative probability density re-estimation.

1. Initialization

The average dimensions of a human hand are approximately 25×25 cm when the hand is fully open. Therefore, the hand region is defined as a cylinder centered along the line L defining the arm orientation, with a radius of 12.5 cm, a height of 25 cm, and with the base positioned at the maximum of the density gradient of the disparity data along L. The pixels with range values within the hand region are used to initialize the hand color probability density function. Only the pixels classified as hand pixels are drawn inside the box that defines the hand region.

2. Iterative Refinement

In one embodiment, the segmentation algorithm uses a non-parametric, histogram based probability density model. In this embodiment, the histogram is obtained by dividing the hue-saturation color subspace into 400 bins, 20 bins for each dimension of the subspace. In this embodiment, the number of bins may be determined empirically to produce a sufficiently smooth estimate. The ratio of hand pixels to the total number of pixels in bin i is based on the formula $r_i = N_i^f / (N_i^f + N_i^b)$ where $N_i^f$ and $N_i^b$ are, respectively, the numbers of hand and non-hand pixels in bin i normalized to account for the difference in the number of hand and non-hand pixels in the entire segmentation region.

In one embodiment, the probability density estimate is computed using a "maximum likelihood" approach through minimization of the negative log-likelihood error function:

$$E_i = \sum_{n=1}^{N_i} \ln p(x_n | r_i)$$

where $N_i$ is the number of pixels in bucket i and $x_n$ is the nth pixel. The optimal values of $r_i$'s are found through an iterative procedure. This iterative algorithm converges to the final answer very rapidly, within two to three iterations. Each error minimization iteration is followed by a pair of morphological operators, that is, erosion followed by dilation.

The color segmentation method is color independent because the initial probability density guess is made accurate through the aid of the 3D range data. Because of the iterative probability density refinement, the method performs well in varied and poor lighting situations and when there are shading variations in the image.

D. Gesture Classification

Gesture classification is performed using the normalized gesture templates obtained through color segmentation and perspective unwarping. A number of recognition engines may be applied on the gesture templates. In one embodiment, classification methods based on template correlation may be used. In another embodiment, classification based on gradient orientation histograms may be used. These are just two examples of many possible classification schemes. In yet another embodiment, shape description by geometric moments may be used.

1. Definition of Geometric Moments

In one embodiment, two dimensional binary moments may be used as shape descriptors for the static hand gesture models. Two dimensional binary moments yield a compressed description of shape in the form of spread, skewness and cross terms. Given discrete random variables x and y and a probability density function f(x,y), the two dimensional central moments $\mu_{pq}$ of order p+q are:

$$\mu_{pq} = \sum_{-\infty}^{\infty} \sum_{-\infty}^{\infty} (x - \bar{x})^p (y - \bar{y})^q f(x, y)$$

where $\bar{x}$ and $\bar{y}$ are the expected values of the random variables. In one embodiment, the two variables x and y are the two pixel coordinates in the normalized gesture template, and the function f(x,y) is the binary indicator function for hand pixels within the template. The use of a simple probability density function contributes to a reducing the effects of variable lighting on recognition.

Because the spatial variance of many static hand gestures is asymmetric, skewness is represented and used to discern gestures. In one embodiment, binary moments of order n=3 are used. To eliminate the effect of hand size variance on recognition, in one embodiment, normalized central moments defined as $\mu_{pq}=\mu_{pq}/\mu_0^\lambda$ where $\lambda=[p+q/2]+1$ are used. In this embodiment, a complete set of moments of order 1 to n consists of $m_{pq}$ such that $p+q \leq n$. That is, in this embodiment, there are ten moments up to the third order, but scale normalization translation invariance fixes the first three of the moments at constant values, yielding a total of seven area normal binary central moments: 20, 11, 02, 30, 21, 12, 03.

2. Matching Moments

Because the above referenced moments are of different orders of magnitude, a simple Euclidean metric cannot be used for successful matching. As such, in one embodiment, the Mahalanobis distance metric, M, is used for matching based on statistical measure of closeness to training examples. This metric is:

$$M(x)=(x-m)^T K^{-1}(x-m)$$

where x is the vector of moments for the given image, m is the vector of moment means computed over the training set, and $K^{-1}$ is the inverse covariance matrix of the moments. This distance gives a variance measure of the input to the training class. With enough training vectors, a reliable statistical threshold can be set. In one embodiment, normalized binary central moments may be calculated with one pass through the image. In this embodiment, $K^{-1}$ is a 7×7 matrix that can be pre-computed such that real-time performance and computation are possible.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

What is claimed is:

1. A method for recognizing gestures comprising:

obtaining an image data;

determining a hand pose estimation based on computing a center of the hand, computing an orientation of the hand in relation to a camera reference frame, performing background subtraction, determining an arm orientation, and computing the hand pose estimation based on the arm orientation;

producing a frontal view of a hand;

isolating the hand from the background; and classifying a gesture of the hand;

wherein computing a center of the hand includes defining a hand region as a cylinder centered along the 3D line with dimensions large enough to include a typical hand, selecting pixels from within the hand region as hand pixels, and averaging the location of all of the hand pixels.

2. The method of claim 1 wherein computing an orientation of the hand further comprises:

defining a hand reference frame with an x component a y component and a z component such that the x component is aligned with the 3D line, the y component is perpendicular to the x component, the y component is parallel to the viewing plane, and the z component is perpendicular to the x component and the y component.

3. A method for recognizing gestures comprising:

obtaining an image data;

determining a hand pose estimation;

producing a frontal view of a hand based on performing perspective unwarping to produce an unwarped frontal view of the hand and scaling the unwarped frontal view of the hand into a template image;

isolating the hand from the background; and classifying a gesture of the hand.

4. The method of claim 3 wherein performing perspective unwarping comprises:

mathematically moving a virtual camera to a canonical location with respect to a hand reference frame.

5. The method of claim 4 wherein mathematically moving the virtual camera comprises:

rotating the virtual camera to align a reference frame of the virtual camera with a reference frame of the hand;

translating the virtual camera to a fixed distance from the orientation of the hands.

6. The method of claim 3 wherein scaling comprises:

choosing a fixed correspondence between the dimensions of the template image and the dimensions of a typical hand.

7. The method of claim 1 wherein isolating the hand comprises:

initializing a hand color probability density function; and refining the hand color probability density function.

8. The method of claim 7 wherein initializing comprises:

using the hand pixels to initialize and evaluate the hue-saturation histogram of the hand color.

9. The method of claim 8 wherein refining comprises:

choosing a part of a color space that contains a majority of the hand pixels to define a hand color;

selecting those pixels in the image surrounding the hand that are of a color corresponding to the hand color;

discarding the hand pixels which are not of the color corresponding to the hand color.

10. The method of claim 3 wherein classifying a gesture comprises:

matching the hand template against a plurality of gesture templates.

11. A method for recognizing gestures comprising:

obtaining an image data;

determining a hand pose estimation;

producing a frontal view of a hand;

isolating the hand from the background;

classifying a gesture of the hand; and matching the hand template against a plurality of gesture templates based on computing geometric moments of a first order, a second order and a third order; and applying a Mahalanobis distance metric.

12. A method for recognizing gestures comprising:

obtaining an image data;

performing background subtraction;

computing a hand pose estimation based on an arm orientation determination;

performing perspective unwarping to produce an unwarped frontal view of a hand;

scaling the unwarped frontal view of the hand into a template image;

isolating the hand from the background using color segmentation; and classifying a gesture of the hand by matching the hand with a plurality of template hand images.

13. The method of claim 12 wherein the image data comprises: a color image comprised of a red value, a green value and a blue value for each pixel of a captured image, and a depth data comprised of an x value in a camera reference frame, a y value in the camera reference frame, and a z value in the camera reference frame for each pixel of the captured image.

14. The method of claim 13 wherein performing background subtraction comprises:

selecting as a foreground arm image those pixels of the depth data where the difference between a mean background depth and the current depth is larger than an empirically defined threshold.

15. The method of claim 14 wherein determining an arm orientation comprises:

computing a three-dimensional (3D) line that defines the arm orientation by fitting a first two dimensional (2D) line to the image data in the image plane and fitting a second 2D line to the image data in the depth dimension in the plane containing the first 2D line such that the second 2D line is perpendicular to the viewing plane.

16. The method of claim 15 wherein computing the hand pose estimation comprises:

computing a center of the hand; and computing an orientation of the hand in relation to the camera reference frame.

17. A system comprising:

a stereo camera coupled to a computer, the computer comprising a processor and a storage device to read from a machine readable medium, the machine readable medium containing instructions which, when executed by the processor, cause the computer to perform operations comprising:

obtaining an image data;

performing background subtraction;

computing a hand pose estimation based on an arm orientation determination;

performing perspective unwarping to produce an unwarped frontal view of a hand; scaling the unwarped frontal view of the hand into a template image;

isolating the hand from the background using color segmentation; and classifying a gesture of the hand by matching the hand with a plurality of template hand images.

18. The system of claim 17 wherein the image data comprises:

a color image comprised of a red value, a green value and a blue value for each pixel of a captured image, and a depth data comprised of an x value in a camera reference frame, a y value in the camera reference frame, and a z value in the camera reference frame for each pixel of the captured image.

19. The system of claim 17 wherein performing background subtraction comprises:

selecting as a foreground arm image those pixels of the depth data where the difference between a mean background depth and the current depth is larger than an empirically defined threshold.

20. The system of claim 17 wherein determining an arm orientation comprises:

computing a three-dimensional (3D) line that defines the arm orientation by fitting a first two dimensional (2D) line to the image data in the image plane and fitting a second 2D line to the image data in the depth dimension in the plane containing the first 2D line such that the second 2D line is perpendicular to the viewing plane.

21. The system of claim 17 wherein computing the hand pose estimation comprises:

computing a center of the hand; and computing an orientation of the hand in relation to a camera reference frame.

22. The method of claim 3 wherein the image data comprises:

a color image and a depth data.

23. The method of claim 22 wherein the color image comprises a red value, a green value and a blue value for each pixel of a captured image, and the depth data comprises an x value in a camera reference frame, a y value in the camera reference frame, and a z value in the camera reference frame for each pixel of the captured image.

24. The method of claim 3 wherein determining a hand pose estimation comprises:

performing background subtraction;

determining an arm orientation; and computing the hand pose estimation based on the arm orientation.

25. A method for recognizing gestures comprising:

obtaining an image data;

determining a hand pose estimation based on performing background subtraction, determining an arm orientation, and computing the hand pose estimation based on the arm orientation, wherein performing background subtraction includes selecting as a foreground arm image those pixels where the difference between a mean background depth and the current depth is larger than an empirically defined threshold;

producing a frontal view of a hand;

isolating the hand from the background; and classifying a gesture of the hand.

26. A method for recognizing gestures comprising obtaining an image data;

determining a hand pose estimation based on performing background subtraction, determining an arm orientation, and computing the hand pose estimation based on the arm orientation, wherein determining an arm orientation includes fitting a first two dimensional (2D) line to the image data in the image plane; fitting a second 2D line to the image data in the depth dimension in the plane containing the first 2D line such that the second 2D line is perpendicular to the viewing plane, and combining the first 2D line and the second 2D line into a three-dimensional (3D) line such that the 3D line defines the arm orientation;

producing a frontal view of a hand;

isolating the hand from the background; and classifying a gesture of the hand.

27. The method of claim 26 wherein fitting a first 2D line comprises:

employing an iterative reweighted least square method; and wherein fitting a second 2D line comprises:

employing an iterative reweighted least square method.

28. The method of claim 27 wherein employing an iterative reweighted least square method comprises:

using a Welsch M-estimator.

29. The method of claim 24 wherein computing the hand pose estimation comprises:

computing a center of the hand; and computing an orientation of the hand in relation to a camera reference frame.

* * * * *